United States Patent [19]

Light

[11] Patent Number: 4,633,994
[45] Date of Patent: Jan. 6, 1987

[54] VISCOUS FAN DRIVE AND AXIALLY MOVABLE VALVE ELEMENT

[75] Inventor: Gerard M. Light, Marshall, Mich.

[73] Assignee: Eaton Corporation, Cleveland, Ohio

[21] Appl. No.: 800,904

[22] Filed: Nov. 22, 1985

Related U.S. Application Data

[63] Continuation of Ser. No. 506,163, Jun. 20, 1983, abandoned.

[51] Int. Cl.⁴ ............................................. F16D 11/00
[52] U.S. Cl. .................................. 192/58 B; 192/96; 192/82 T
[58] Field of Search ............ 192/82 T, 58 B, 96, 192/0.02 R, 0.096; 137/56; 123/41.12

[56] References Cited

U.S. PATENT DOCUMENTS

| | | | |
|---|---|---|---|
| 3,144,922 | 8/1984 | Weir | 137/56 |
| 3,339,588 | 9/1967 | Harvey | 192/58 B |
| 3,403,764 | 10/1968 | Sutaruk | 192/58 B |
| 3,893,555 | 7/1975 | Elmer | 192/58 B |
| 4,056,178 | 11/1977 | Detty | 192/58 B |
| 4,265,348 | 5/1981 | Clarke | 192/58 B |
| 4,281,750 | 8/1981 | Clancey | 192/82 T |
| 4,295,550 | 10/1981 | Hayashi | 192/58 B |
| 4,305,491 | 12/1981 | Rohrer | 123/41.12 |
| 4,310,084 | 1/1982 | Nonnenmann | 192/58 B |
| 4,346,797 | 8/1982 | Bopp | 192/58 B |
| 4,355,709 | 10/1982 | Light | 192/58 B |
| 4,403,757 | 9/1983 | Shepherd | 192/82 T |
| 4,458,798 | 7/1984 | Bopp | 192/58 B |
| 4,466,518 | 8/1984 | Mueller | 192/3.29 |

FOREIGN PATENT DOCUMENTS 2076908 12/1981 United Kingdom ............... 192/3.29

Primary Examiner—Samuel Scott
Assistant Examiner—Noah Kamen
Attorney, Agent, or Firm—C. H. Grace; L. J. Kasper

[57] ABSTRACT

A fluid coupling device is provided of the type including an input coupling member (11) and an output coupling assembly (13). The unit includes a fluid operating chamber (33) and a fluid reservoir chamber (37), and a valve means (55) is included to control the flow of fluid between the chambers. The valve means (55) includes an elongated valve element (57) which is moved axially in response to energization of an electromagnetic coil (75). The valve element (57) includes a control portion (71) which is oriented at approximately a right angle relative to the valve element (57). The flow control portion is in engagement with a cylindrical surface (51) which defines the valve port (53), such that axial movement of the valve element results in sliding engagement between the control portion (71) and surface (51) to cover and uncover the valve port (53).

6 Claims, 4 Drawing Figures

VISCOUS FAN DRIVE AND AXIALLY MOVABLE VALVE ELEMENT

CROSS-REFERENCE TO RELATED APPLICATION

This application is a continuation of U.S. application Ser. No. 506,163, filed June 20, 1983, now abandoned.

BACKGROUND OF THE DISCLOSURE

The present invention relates to fluid coupling devices of the type including valve means operable to control the quantity of fluid in the fluid operating chamber. More particularly, the present invention relates to fluid coupling devices of the type including a valve element which is actuated to move in an axial direction between the open and closed positions.

Remotely actuated fluid coupling devices are especially adapted to the use of valve elements which move in an axial direction, because, in a remotely actuated coupling, movement of the valve is usually achieved by means of a device such as a solenoid or fluid pressure piston arrangement which inherently has an axial output movement. It should be understood, however, that the present invention is not limited to use in a fluid coupling device which is controlled by a remote sensing device. The present invention could also be used advantageously in a fluid coupling device in which the valve element is actuated in the manner shown in U.S. Pat. No. 3,144,922.

Axially movable valve elements in fluid coupling devices may have certain advantages over rotary valve elements, especially with regard to the simplicity of the valve actuation mechanism. However, there have been several major problems associated with axially movable valve elements. A first problem is the amount of force required to move the valve element axially and uncover the fill port. One cause for the high valve actuation forces is a phenomenon known as "stiction" wherein a flat portion of the valve element is in face-to-face engagement with the adjacent port plate with a thin film of viscous fluid therebetween, such that separation of the valve arm from the port plate requires a certain amount of force to break the fluid film.

Another cause of the high valve actuating force is the fluid pressure head acting to hold the valve element against the port plate. This pressure head is caused by the centrifugal force acting on the fluid as the coupling rotates, and the actual force on the valve arm is equal to at least the product of the fluid pressure against the arm and the area of the fill port being covered by the valve arm. The effect of the fluid pressure head on the valve arm, both for the prior art device and for the present invention, will be described in greater detail subsequently in the specification. High valve actuation forces are especially undesirable in the case of an electrically-actuated fluid coupling in which the size and weight of the solenoid increases exponentially in order to achieve an increase in the output force of the solenoid.

Another problem which has been observed in regard to axially movable valve elements is the lack of an accurate, predictable correlation between the amount of valve lift (axial movement) and flow through the fill port. As is understood by those skilled in the art, when a flat valve arm is lifted from a port plate, the effective port area is not merely equal to the area of the port, nor is the effective port area equal to the product of the circumference of the port and the amount of lift. Instead, it has been found that because of such factors as the flow characteristics of the fluid, fluid viscosity, speed of the coupling, etc., actual valve lift must be substantially greater than the theoretical valve lift in order for the effective port area to be equal to the actual area of the port. This situation makes it even more difficult than usual to achieve a desired relationship between the external condition, such as ambient air temperature or coolant temperature, and output speed (fan speed) of the coupling.

SUMMARY OF THE INVENTION

Accordingly, it is an object of the present invention to provide an improved fluid coupling device utilizing an axially movable valve element in which the forces required to actuate the valve are substantially reduced.

It is another object of the present invention to provide a fluid coupling device and axially movable valve element wherein the relationship between valve movement and flow rate through the fill port is substantially more accurate and predictable than in the prior art.

The above and other objects of the present invention are accomplished by the provision of an improved fluid coupling device of the type including a first rotatable coupling member defining an axis of rotation and cover means associated with the first member to define a fluid chamber. Valve means is disposed to separate the fluid chamber into a fluid operating chamber and a fluid reservoir chamber. A second rotatable coupling member is disposed in the operating chamber and is rotatable relative to the first coupling member. The valve means is operable to control the flow of fluid between the reservoir chamber and the operating chamber and includes a valve port and an elongated valve member oriented generally transverse to the axis. The valve member is disposed to have at least a portion thereof move axially between first and second positions in response to variations in an axial input.

The coupling device is characterized by the first coupling member defining a surface portion oriented generally parallel to the axis of rotation and which comprises a peripheral boundary of the fluid reservoir chamber, the annular surface portion defining the valve port. The first coupling member further defines fluid passage means communicating between the valve port and the fluid operating chamber. The valve member includes a valve portion disposed to prevent substantial fluid flow through the valve port when the valve member is in the first position, and to permit substantial fluid flow through the valve port when the valve member is in the second position.

DESCRIPTION OF THE PREFERRED EMBODIMENT

Figure 1:
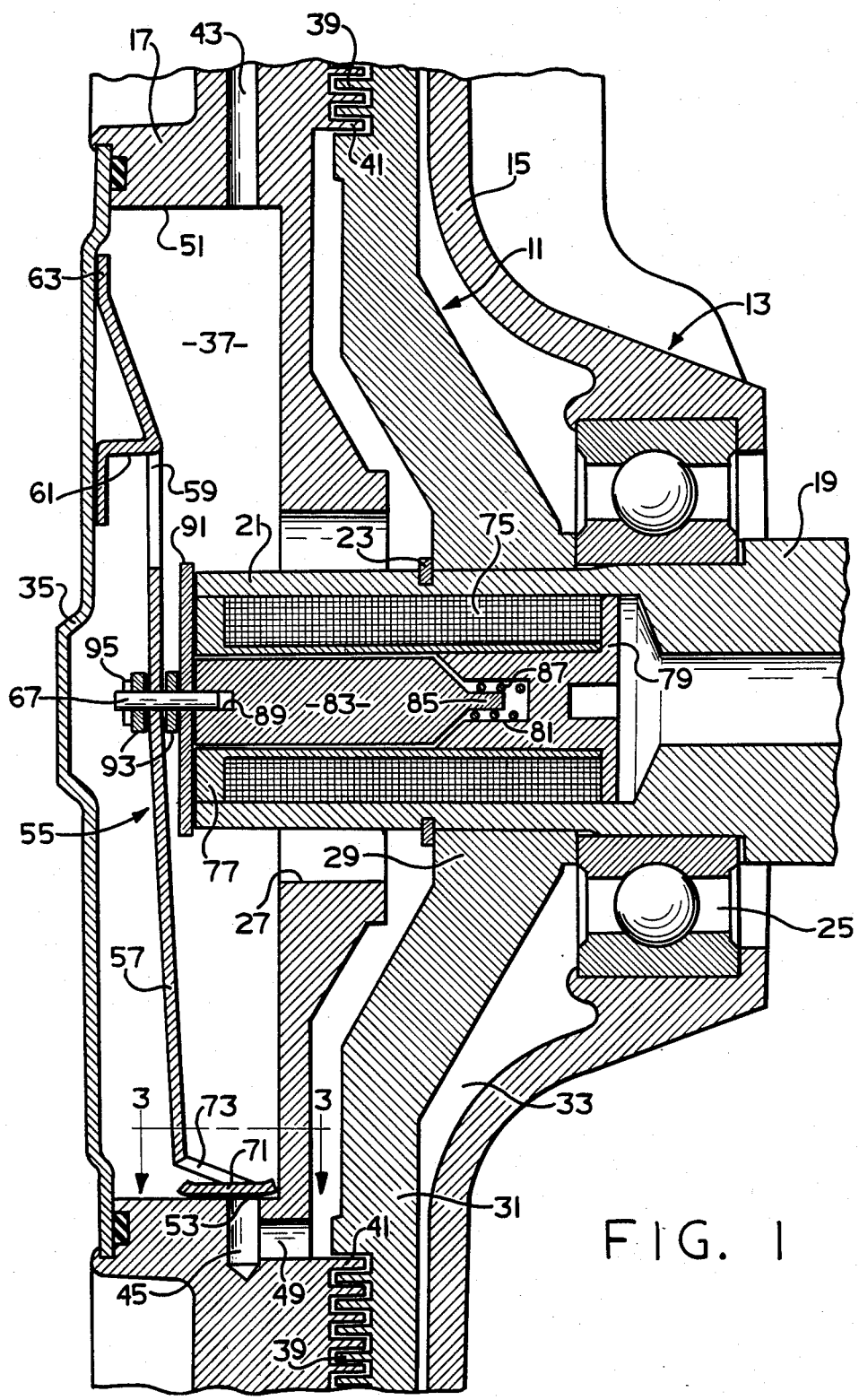
FIG. 1 is a fragmentary, axial cross section of a fluid coupling device utilizing the present invention.

Referring now to the drawings, which are not intended to limit the invention, FIG. 1 illustrates one preferred embodiment of a fluid coupling device of the type in which the present invention may be utilized. The fluid coupling device includes an input coupling member, generally designated 11, and an output coupling assembly, generally designated 13. The assembly 13 includes a cast metal housing member 15 and a cast metal cover member 17, the members 15 and 17 being secured together by a plurality of bolts (not shown). The overall construction of the portions of the coupling device not shown in FIG. 1 may be generally as shown and described in U.S. Pat. No. 4,281,750, assigned to the assignee of the present invention and incorporated herein by reference.

The fluid coupling device includes an input shaft 19 including a generally cylindrical hollow portion 21 on which the input coupling member 11 is mounted and retained by a snap ring 23. The input shaft 19 functions as a support for the inner race of a bearing set 25, which is seated on the inside diameter of the housing member 15. The hollow portion 21 of the input shaft 19 extends forwardly (to the left in FIG. 1) through a central opening 27 defined by the cover member 17.

The input coupling member 11 is generally annular and includes a hub portion 29 and an annular, disc-like portion 31. The hub portion 29 is pressed onto a portion of the hollow portion 21, such that rotation of the input shaft 19 causes rotation of the input coupling 11.

The housing member 15 and cover member 17 cooperate to define a fluid operating chamber 33, within which the input coupling 11 is rotatably disposed. The coupling member 17 cooperates with a stamped cover member 35 to define therebetween a fluid reservoir chamber 37.

In the subject embodiment, the forward surface of the disc-like portion 31 of the input coupling 11 forms a plurality of annular lands 39 which define a plurality of annular grooves therebetween. The adjacent surface of the cover member 17 forms a plurality of annular lands 41 which define a plurality of annular grooves therebetween. The lands 39 and 41 are interdigitated to define a serpentine-shaped shear space therebetween, as is well known in the art. Although the present invention may be utilized in a fluid coupling device having various shear space configurations, it is especially advantageous in a device having a forward shear space, and more specifically, in such a device in which the shear space is defined by interdigitated lands and grooves.

As is well known to those skilled in the art, adjacent the outer periphery of the shear space defined by the lands 39 and 41, is a pumping means (not shown) which pumps fluid out of the shear space and back to the fluid reservoir chamber 37 by means of a radial passage 43 defined by the cover member 17. The cover member 17 also defines a radial passage 45, and further defines an axial passage 49 which communicates with the radial passage 45 and with the innermost extent of the shear space. The cover member 17 defines a generlly cylindrical surface 51 which serves as the peripheral boundary of the fluid reservoir chamber 37. The intersection of the radial passage 45 and the cylindrical surface 51 forms a valve port 53 which may best be seen in FIGS. 3 and 4. In operation, when the valve port 53 is uncovered, fluid flows by centrifugal force from the reservoir chamber 37 through the port 53, the radial passage 45, then through the axial passage 49 into the shear space.

Valve Means

Communication of fluid from the reservoir chamber 37 through the valve port 53 is controlled by a valve means, generally designated 55. In the subject embodiment, the valve means 55 is illustrated as including an electromagnetic valve actuation device, which is controlled electrically by means of a remote condition sensing device, as is well known in the art. However, as mentioned in the background of the disclosure, it is essential for purposes of the present invention only that the valve means include some form of axial actuation mechanism.

Figure 2:
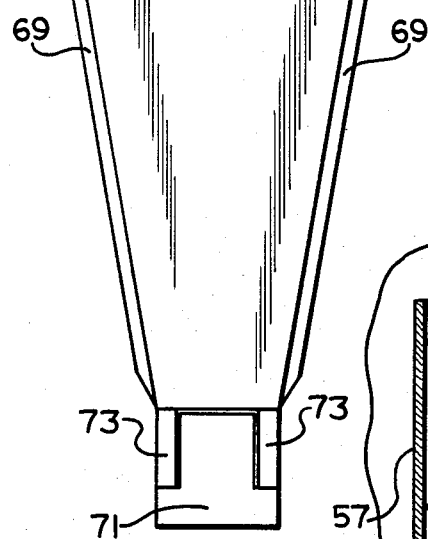
FIG. 2 is an elevation view of the valve member included in the fluid coupling device shown in FIG. 1.

The valve means 55 includes an elongated valve element 57, which is shown generally in elevation view in FIG. 2. Preferably, the valve element 57 is formed as a thin, metal stamping, although neither the material of the valve element 57, nor its exact configuration are essential features of the present invention, except as noted hereinafter.

Toward the upper portion of the valve element 57 is a cutout portion 59, which is formed by stamping a right angled support portion 61, the vertical leg of which may be welded to the cover member 35, or attached thereto by other suitable means. The extrememe upper end of the valve element 57 includes a terminal support portion 63 which is also attached to the cover member 35 to provide a solid, rigid mounting of the valve element 57, relative to the rest of the coupling device.

The valve element 57 also defines a central opening 65, disposed on the axis of rotation of the coupling device, and which receives an actuation pin 67 (shown only in FIG. 1). Movement of the actuation pin 67 results in axial movement of the lower portion of the valve element 57, and is achieved in a manner which will be described subsequently.

As may best be seen in FIG. 2, the valve element 57 includes, along the sides of its lower portion, a pair of angled portions 69, the function of which is to provide additional rigidity to the valve member 57.

At the extreme lower end of the valve element 57 is a flow control portion 71 which is connected to the main body of the valve element 57, and suspended therefrom, by a pair of integral support members 73. The flow control portion 71 is in generally face-to-face engagement with the cylindrical surface 51, such that the portion 71 is able to block fluid flow from the reservoir chamber 37 into the valve port 53, as will be described in greater detail subsequently. In the subject embodiment, the surface 51 is generally cylindrical, except that a region immediately surrounding the valve port 53 is milled flat to facilitate face-to-face engagement between the valve port 53 and the flow control portion 71, which typically is a flat stamped portion.

As may best be seen in FIG. 1, the flow control portion 71 is disposed at approximately a right angle relative to the rest of the valve element 57. It should be noted that in the elevation view of the valve element 57 (FIG. 2), the control portion 71 and support members 73 are shown as being in the same plane as the rest of the valve element 57, merely for ease of illustration. It is an essential feature of the present invention that the flow control portion 71 be disposed generally as shown in FIG. 1, such that axial movement of the valve element 57 results in sliding engagement between the control portion 71 and the cylindrical surface 51, rather than axial separation between the valve element and the valve port, as in the prior art. In the subject embodiment, the surface 51 is generally cylindrical, such that the valve port 53 lies in a plane which is generally parallel to the axis of the coupling. Such an arrangement is acceptable when the plane of the valve element 57 is oriented generally perpendicular to the axis of rotation. However, within the scope of the present invention, the plane of the valve element 57 may be oriented other than perpendicular to the axis of rotation, in which case the surface 51 could be other than cylindrical, and it would be necessary only that the plane containing the valve port 53 be oriented generally perpendicular to the plane of the valve element 57 to facilitate the face-to-face sliding engagement between the flow control portion 71 and valve port 53.

Referring now primarily to FIG. 1, one preferred mechanism for actuating the valve element 57 axially will be described briefly. Disposed within the hollow portion 21 is an electromagnetic coil 75 which, as is well known in the art, would be connected to an external electrical source (not shown) by means of some form of slip ring assembly (not shown) mounted on the input shaft 19, the slip ring assembly being connected to the coil 75 by suitable electrical leads (not shown). The coil 75 is supported on a non-magnetic cylindrical support member 77. Disposed within the right end in FIG. 1 of the member 77 is a spring seat member 79 which defines a cylindrical recess 81.

Slidably disposed within the left end of the cylindrical support member 77 is an armature member 83 which includes, at its right end in FIG. 1, a spring guide portion 85. The armature member 83 is normally biased to the left in FIG. 1 by means of a compression spring member 87 which is disposed about the guide portion 85 and received within the cylindrical recess 81.

The left end of the armature member 83 includes a cylindrical opening into which is press-fit a pin member 89. Disposed on the pin member 89 is a large washer member 91, a pair of relatively small thrust washers 93 disposed on opposite sides of the valve element 57, and finally, a C clip 95 to retain member 91, washers 93, and valve element 57 on the pin 89.

As is well known to those skilled in the art of electromagnetism, the input shaft 19, the spring seat member 79, the armature member 83, and the washer member 91 are all fabricated from a ferrous material, such that energization of the coil 75 results in the formation of an electromagnetic flux path through the hollow portion 21, member 79, member 83, and washer 91. Another embodiment of an electromagnetic coil is illustrated and described in U.S. Pat. No. 4,305,491, assigned to the assignee of the present invention and incorporated herein by reference.

Operation

Figure 3:
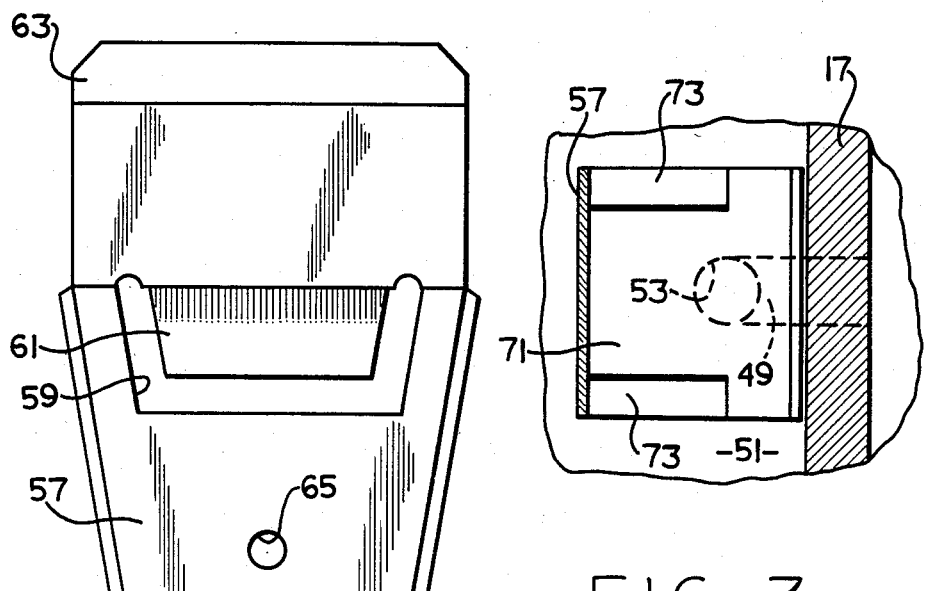
FIG. 3 is a transverse cross section taken on line 3—3 of FIG. 1, illustrating the valve member of the invention in the closed position.
Figure 4:
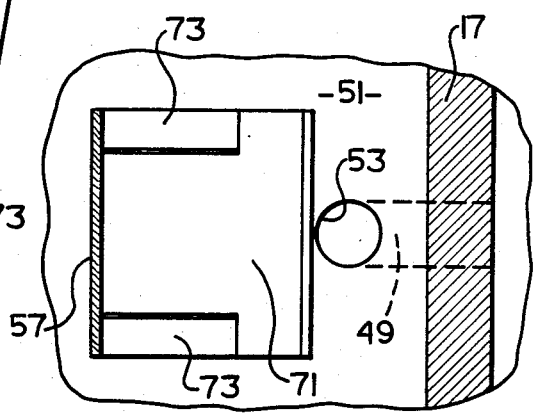
FIG. 4 is a transverse cross section, similar to FIG. 3, illustrating the valve member in the open position.

Referring now to FIG. 1, in conjunction with FIGS. 3 and 4, the operation of the invention will be described in some detail. When the remote condition sensing device senses that cooling is not presently required, an electrical signal is sent to energize the coil 75, thus creating the magnetic flux path previously described. In the subject embodiment, the flux path is oriented in such a way as to exert a force on the armature member 83, biasing it to the right in FIG. 1, overcoming the biasing force of the spring member 87. This force on the armature 83 moves it and the valve element 57 to the position shown in FIG. 1. In this position, the flow control portion 71 completely covers the valve port 53, thus substantially preventing flow of fluid from the reservoir chamber 37 through the passages 45 and 49 into the shear space. As a result, the fluid coupling device operates in the disengaged mode, as is well known in the art.

When the remote condition sensing device senses a need for increased cooling (increased coupling output speed), the electrical signal to the coil 75 is discontinued, thus permitting the magnetic flux path to deteriorate. This eliminates the electromagnetic force acting on the armature member 83, and permits the spring member 87 to bias the armature 83 toward the left again, thus moving the valve element 57 to the left, and moving the flow control portion 71 to the left, to the position shown in FIG. 4. In the open position shown in FIG. 4, the flow control portion 71 is no longer blocking fluid flow from the reservoir chamber 37 into the valve port 53, and fluid is now able to flow through the passages 45 and 49 and into the shear space, such that the coupling device will now operate in the engaged mode.

It is one important aspect of the present invention that as the valve element 57 is moved axially toward the open position, the actual valving action occurs by means of the flow control portion 71 sliding along the cylindrical surface 51 to gradually uncover the valve port 53, rather than being suddenly separated from the valve port in an axial direction, as in the prior art. As was mentioned in the background of the disclosure, in the prior art axial valve arrangement, the force required to move the valve was the product of the pressure acting against the valve and the area of the port, over which the pressure acts. In the case of the present invention, however, because the flow control portion 71 is being slid along the surface 51, rather than lifted from the surface, the force required to move the valve element 57 and portion 71 is equal to the product of the fluid pressure head and the area of the port 53, and the coefficient of sliding friction between the portion 71 and surface 51. Therefore, because the coefficient of friction in such a situation is always substantially less than unity (1.0), the force required to move the valve element 57 will always be substantiall less than the force required to move the prior art axial valve arm. For example, if the pressure head in the reservoir chamber, near the periphery thereof, were approximately 20 psi, and if the area of the valve port 53 were 0.2 square inches, the force required to move the prior valve arm axially would be four pounds. However, by utilizing the present invention, if the coefficient of sliding friction between the portion 71 and surface 51 were about 0.15, the force required to move the valve arm 57 axially would be only 0.6 pounds.

It may also be seen that by using the present invention, it is possible to have a very accurate, predictable relationship between axial movement of the valve element 57 and the effective port area, i.e., the extent of opening of the valve port 53. As a result, it is possible with the present invention to achieve any particular desired relationship between the external condition being sensed, and the output speed of the coupling.

The invention has been described in great detail, sufficient to enable those skilled in the art to make and use the same. It is believed that upon a reading and understanding of the foregoing specification, certain alterations and modifications will become apparent to those skilled in the art, and it is intended to include all such alterations and modifications as part of the invention, insofar as they come within the scope of the appended claims.

I claim:

1. In a remote temperature-sensing fluid coupling device of the type including a first rotatable coupling member defining an axis of rotation, cover means associated with said first member to define a fluid chamber therebetween, means disposed to separate said fluid chamber into a fluid operating chamber and a fluid reservoir chamber, a second rotatable coupling member disposed in said fluid operating chamber and being rotatable relative to said first coupling member, valve means being operable to control the flow of fluid between said reservoir chamber and said operating chamber, and including a fill port and an elongated valve member oriented generally transverse to said axis and disposed to have at least a portion thereof move axially between first and second positions in response to variations in an axial input, characterized by:
   (a) said first coupling member defining an annular surface portion oriented generally parallel to said axis of rotation, said annular surface portion comprising a peripheral boundary of said fluid reservoir chamber, said annular surface portion defining said fill port, said first coupling member further defining fluid passage means communication between said fill port and said fluid operating chamber; and
   (b) said valve member including a flow control portion disposed to prevent substantial fluid flow through said fill port when said valve member is in said first position, and to permit substantial fluid flow through said fill port when said portion of said valve member moves axially from said first position to said second position.

2. A device as claimed in claim 1 characterized by said annular surface portion comprising a generally cylindrical surface, said flow control portion being oriented at approximately a right angle to said valve member.

3. A device as claimed in claim 1 characterized by said flow control portion being disposed in sliding engagement with said annular surface portion in the region of said fill port.

4. A device as claimed in claim 1 characterized by said valve member comprising a generally planar, stamped metal member, said flow control portion being formed integrally therewith and attached to said valve member by at least one support member, formed integrally with said valve member and said flow control portion.

5. A device as claimed in claim 1 characterized by said valve member comprising a pair of said support members, said flow control portion being attached to said valve member only by said support portions whereby said flow control portion remains in face-to-face, sliding engagement with said annular surface portion during said axial movement of said valve member.

6. In a remote temperature-sensing fluid coupling device of the type including a rotatable output coupling member defining an axis of rotation, cover means associated with output coupling member to define a fluid chamber therebetween, means disposed to separate said fluid chamber into a fluid operating chamber and a fluid reservoir chamber, a rotatable input coupling member disposed in said fluid operating chamber and being rotatable relative to said output coupling member, valve means being operable to control the flow of fluid between said reservoir chamber and said operating chamber, and including a fluid fill port and an elongated valve member oriented generally transverse to said axis and disposed to have at least a portion thereof move axially between first and second positions in response to variations in an axial input, characterized by:
   (a) said output coupling member defining a generally cylindrical surface portion defining the outer boundary of said fluid reservoir chamber, said cylindrical surface portion defining said fluid fill port, said output coupling member further defining fluid passage means communicating between said fluid fill port and said fluid operating chamber; and
   (b) said valve member including a flow control portion disposed to be in sliding engagement with said cylindrical surface portion, and disposed to cover said fluid fill port when said valve member is in said first position, and to uncover said fluid fill port when said valve member is in said second position.

* * * * *